United States Patent [19]
Irie

[11] 3,852,006
[45] Dec. 3, 1974

[54] MOULD ASSEMBLY OF TIRE VULCANIZER

[75] Inventor: Nobuhiko Irie, Nagasaki, Japan

[73] Assignee: Mitsubishi Jukogyo Kabushiki Kaisha, Tokyo, Japan

[22] Filed: Oct. 1, 1973

[21] Appl. No.: 402,174

[52] U.S. Cl. .................................. 425/47, 425/46
[51] Int. Cl. ............................................ B29h 5/02
[58] Field of Search ............ 425/46, 47, 17, DIG. 5

[56] References Cited
UNITED STATES PATENTS

| | | | |
|---|---|---|---|
| 3,082,480 | 3/1963 | Balle | 425/46 |
| 3,460,197 | 8/1969 | Cantarutti et al. | 425/46 |
| 3,779,677 | 12/1973 | Greenwood | 425/46 |

FOREIGN PATENTS OR APPLICATIONS

| | | | |
|---|---|---|---|
| 1,169,118 | 4/1964 | Germany | 425/17 |

*Primary Examiner*—J. Howard Flint, Jr.
*Attorney, Agent, or Firm*—Cushman, Darby & Cushman

[57] ABSTRACT

A mould assembly of a tire vulcanizer, of the type having a stationary lower mould, an upper mould moved up and down by a bolster plate, and a plurality of tread moulds arranged around the lower mould and movable radially of the lower mould, the radial movement of the tread moulds being caused by the vertical movement of the bolster plate. The mould assembly includes means for vertically moving the bolster plate and the upper mould relative to each other, outer ring walls suspended from the bolster plate and arranged around the tread moulds, links pivotally connecting the outer ring walls with the tread moulds respectively, means for vertically adjusting the points where the links are pivotally connected with the outer ring walls, means provided on the bolster plate for parting the plate from the upper mould in contact with the lower mould and a member provided on the upper mould and having a horizontal guide surface for guiding each tread mould in the radial direction.

3 Claims, 16 Drawing Figures

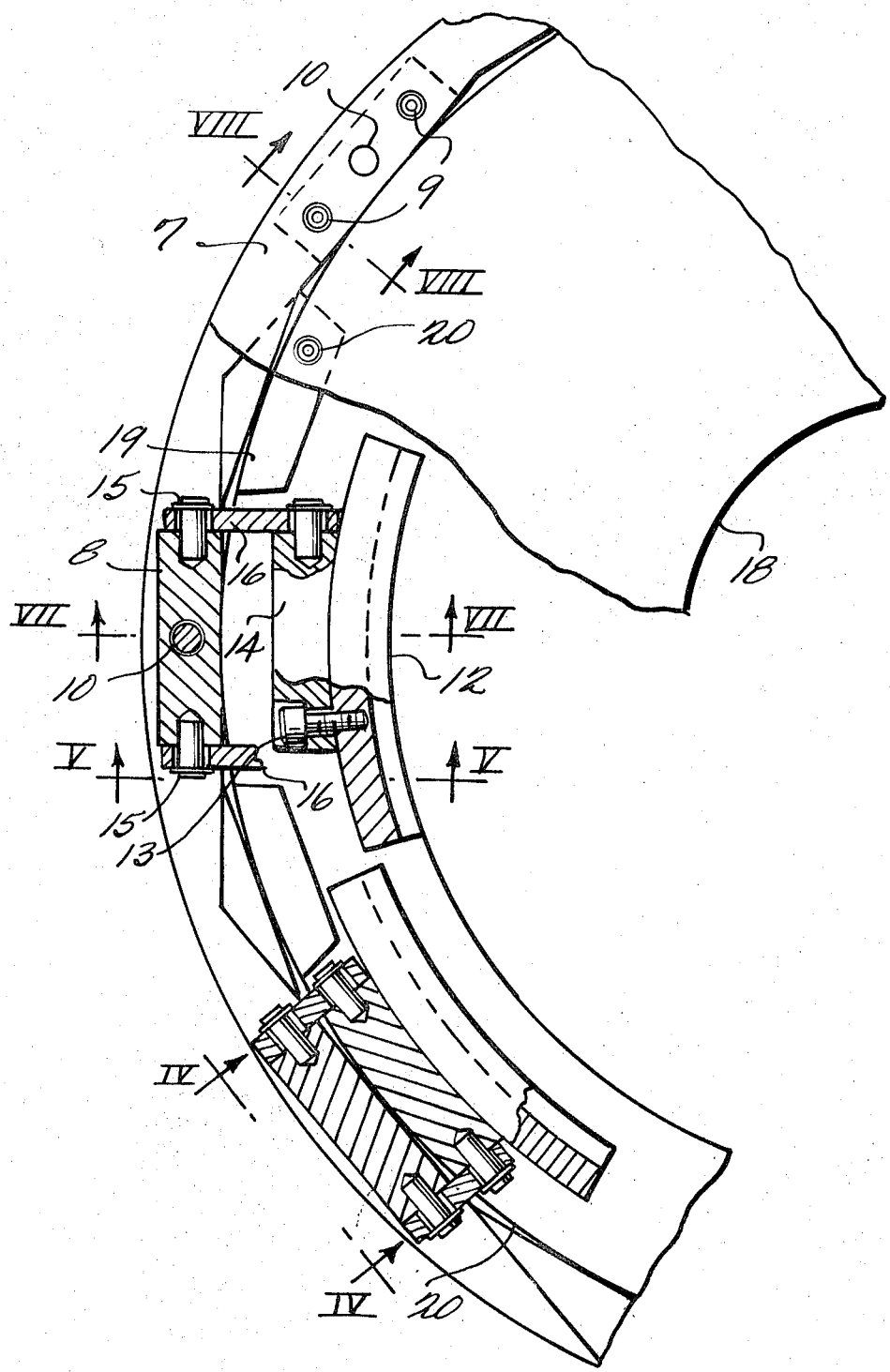

MOULD ASSEMBLY OF TIRE VULCANIZER

BRIEF DESCRIPTION OF THE PRIOR ART AND SUMMARY OF THE INVENTION

This invention relates to a mould assembly of a tire vulcanizer and more particularly to improvements in a device for moving a plurality of tread moulds in the radial direction of a lower mould incident to upward movement of a bolster plate.

As a device for moving a plurality of tread moulds in the radial direction of a lower mould incident to upward movement of a bolster plate (a press plate of a main body of a tire vulcanizer), the one shown in FIGS. 1 and 2 has been known. In FIGS. 1 and 2, reference character $a$ designates a stationary lower mould, $b$ an upper mould moved up and down by a bolster plate (not shown), $c$ a plurality of tread moulds arranged around the lower mould $a$, $a_1$ a projection protruding from the lower mould $a$ towards the tread moulds $c$, $c_1$ a projection protruding from each tread mould $c$ towards the lower mould $a$, $d$ a dovetail guide protruding from the lower edge of the outer periphery of the upper mould $b$ towards each tread mould $c$, $e$ bolts fixing each dovetail guide to the upper mould, and $f$ an inclined groove formed in each tread mould $c$ in which the inner end of each dovetail guide $d$ is slidably engaged. This known device operates in such a manner that when the upper mould $b$ moves down to the end of its downward stroke as shown in FIG. 1, each tread mould $c$ takes the position shown with its projection $c_1$ in meshing engagement with the projection $a_1$ of the lower mould $a$ and, when the upper mould $b$ moves upward, the inner end of each guide $d$ slides in the inclined groove $f$ of the corresponding tread mould $c$, causing the tread mould to move radially outwardly of the mould assembly. In the upward movement of the upper mould $b$, the radially outwardly moving tread mould $c$ is held against upward movement by the engagement between the projections $c_1$ and $a_1$, and the tread mould $c$ starts moving upward together with the upper mould $b$ at the point when the projection $c_1$ is disengaged from the projection $a_1$ (when the upper surface of the guide $d$ abuts against the closed upper end of the groove $f$).

The mould assembly described above, since the radial movement of each tread mould $c$ is effected by the inclined groove formed therein and the guide $d$ provided on the upper mould $b$, has the disadvantage that it is liable to problems caused by the presence of foreign substances between the engaging surfaces of the guide and the groove. Further, in the vulcanization of a tire which is carried out at a temperature of 160° or higher, each mould tends to expand outwardly due to its thermal expansion and the high pressure applied thereto from the interior of the tire being moulded, and in addition, the tread moulds $c$ vary from one another in dimensional accuracy due to non-uniformity of machining, so that a gap tends to be formed between adjoining moulds. The formation of the gap undesirably results in formation of burrs on the tire, degradation of uniformity as well as appearance and quality of the tire, and an increase of manhours for the subsequent processes. In this type of mould assembly, it is essential that the moulding position of the moulds, particularly the tread moulds $c$, (the positions shown in FIG. 1), are adjustable so as not to form a gap between the adjoining moulds, but such adjustment is impossible in the type of mould assembly shown in FIGS. 1 and 2. Furthermore, in the mould assembly shown in FIGS. 1 and 2, the amount of movement of the tread moulds $c$, which is determined by the height of the inclined grooves $f$ from a horizontal plane, is so small that deep grooves cannot be formed in the tread surface of the tire.

In order to overcome such disadvantages, the present invention is concerned with a mould assembly of a tire vulcanizer, of the type having a stationary lower mould, an upper mould moved up and down by a bolster plate, and a plurality of tread moulds arranged around the lower mould and being movable radially of the lower mould, the radial movement of the tread moulds being caused by the vertical movement of the upper mould. The improved mould assembly comprises means for vertically moving the bolster plate and the upper mould relative to each other, outer ring walls suspended from the bolster plate and arranged around the outer side of the tread moulds, links pivotally connecting the outer ring walls with the tread moulds respectively, means for vertically adjusting the points where the links are pivotally connected with the outer ring wall, means provided on the bolster plate for parting the plate from the upper mould in contact with the lower mould and a member provided on the upper mould and having a horizontal guide surface for guiding each tread mould in the radial direction. The object of the present invention is to provide an improved mould assembly of a tire vulcanizer, in which a mechanism for moving tread moulds in the radial direction operates free of trouble and the moulding positions of the tread moulds can be easily adjusted even after they are fitted to the vulcanizer, and which is capable of forming deep tire grooves.

In the operation of the mould assembly of the invention constructed as described above, when the means for parting the bolster plate from the upper mould is actuated in the state in which the upper mould is in contact with the lower mould, that is, in the closed state of the mould assembly, the bolster plate and the outer ring wall are raised upwardly to the end of the stroke of the parting means and each tread mould tends to be lifted slantingly upwardly through the links. However, the guide surface of the member provided on the upper mould integrally therewith prevents the upward movement of the tread mould and permits only the horizontal movement of the same, so that each tread mould moves radially outwardly and parts from the lower mould. When the bolster plate has reached the end of the stroke of the aforesaid means, it moves upwardly thereafter accompanying the upper mould, the outer ring wall and the tread moulds. On the contrary, when the bolster plate moves down and approaches the lower mould, the respective members mentioned above operate in reverse and the upper mould contacts the lower mould, while each tread mould moves radially inwardly, and thus, the mould assembly is closed and vulcanization can be carried out therein in a known manner.

According to the invention, as described above, the radial movement of each tread mould is effected through the intermediary of the links and not by causing the guide to slide in the inclined groove as in the conventional device. Therefore, with the device of the invention, the problems can be eliminated which have been encountered in the conventional device due, for example, to the presence of foreign substances at the engaging portions, and the vulcanizer can be operated highly advantageously.

In the present invention, each tread mould is guided in the horizontal direction by the member which is provided on the upper mould integrally therewith. Each tread mould is connected to the outer ring wall through the links and the points where the links are pivotally connected to the outer ring wall are vertically adjustable. The moulding position of each tread mould can be shifted radially inwardly simply by adjusting the points of pivotal connections upwardly and can be shifted radially outwardly simply by adjusting them downwardly. Thus, the adjustment of tread moulds can be made even after the tread moulds are fitted to the vulcanizer, and the adjusting operation is very simple because it is only necessary to move the outer ring wall upwardly or downwardly as by screws.

Furthermore, in the present invention the amount of radial movement of the tread moulds is determined by the length of the links and, therefore, deep tire grooves can be formed in a tire of a larger diameter than the tire in which the same tire grooves can be formed by the conventional mould assembly, since the amount of movement of the tread moulds can be made larger than that of the tread moulds of the conventional mould assembly.

BRIEF DESCRIPTION OF THE DRAWINGS

FIG. 3 is a fragmentary plane view of an embodiment of the mould assembly of a tire vulcanizer, according to the present invention.

DETAILED DESCRIPTION OF THE DRAWINGS

Figure 1:
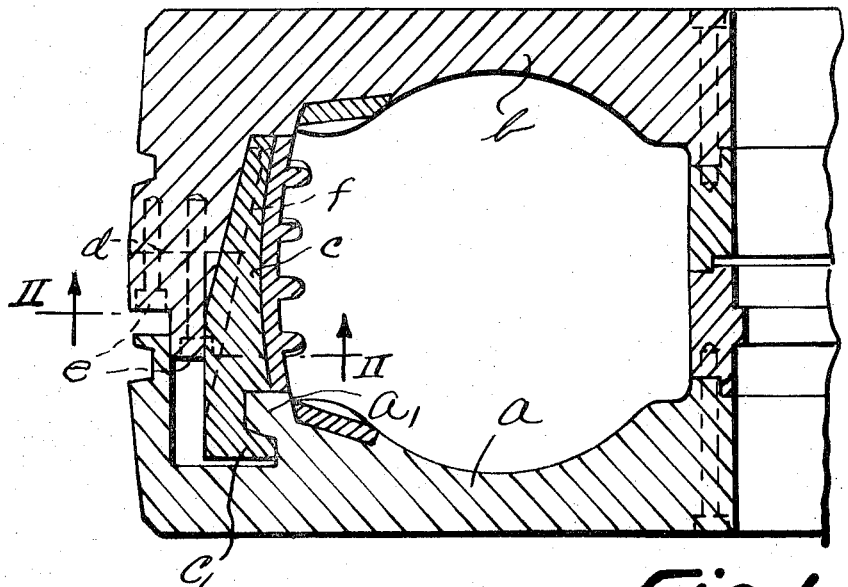
FIG. 1 is a vertical sectional side view of a conventional mould assembly of a tire vulcanizer.
Figure 2:
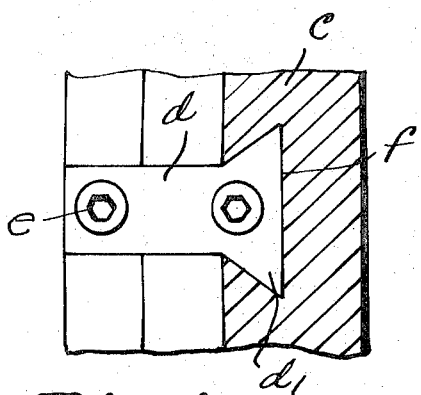
FIG. 2 is a fragmentary transverse sectional view taken along the line II—II of FIG. 1.
Figure 4:
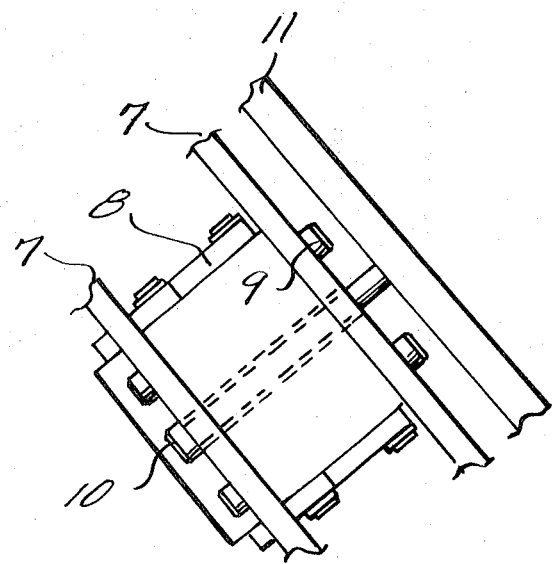
FIG. 4 is a fragmentary side view looking in the direction of the arrow IV in FIG. 3.
Figure 5:
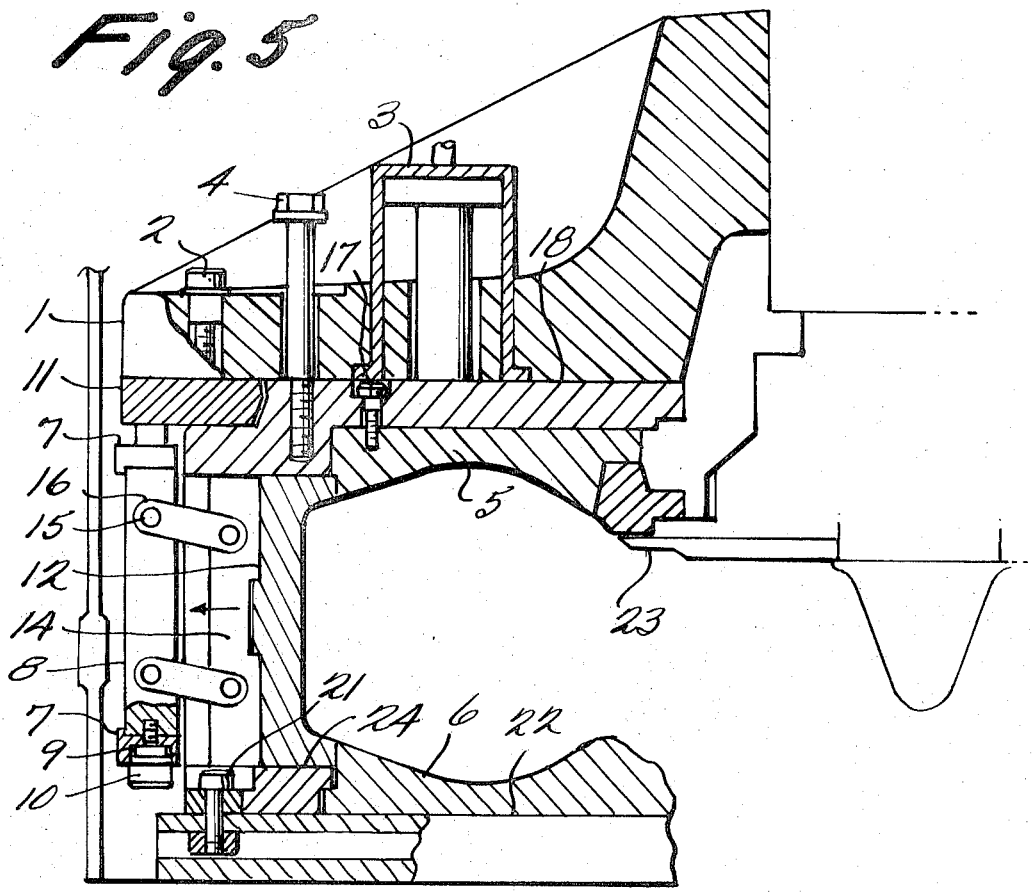
FIG. 5 is a fragmentary vertical sectional side view taken along the line V—V of FIG. 3, the mould assembly being in a closed position.
Figure 6:
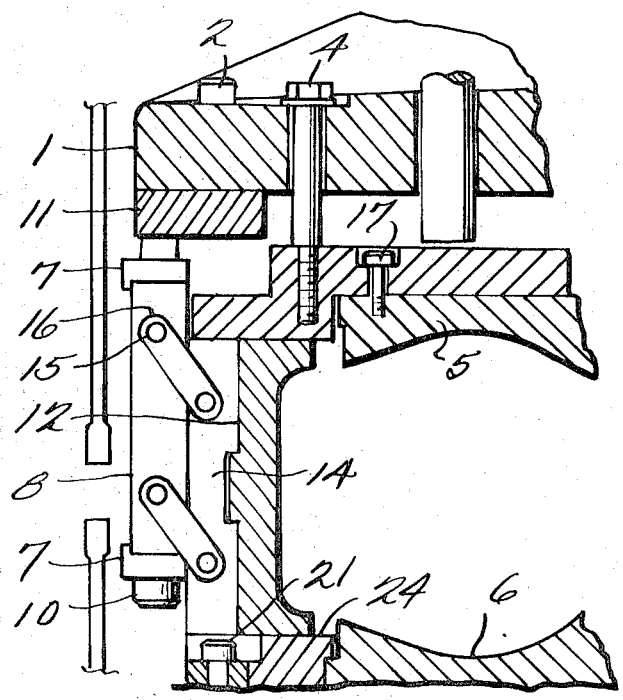
FIG. 6 is a fragmentary vertical sectional side view taken along the line of V—V of FIG. 3, the mould assembly being in an open position.
Figure 7:
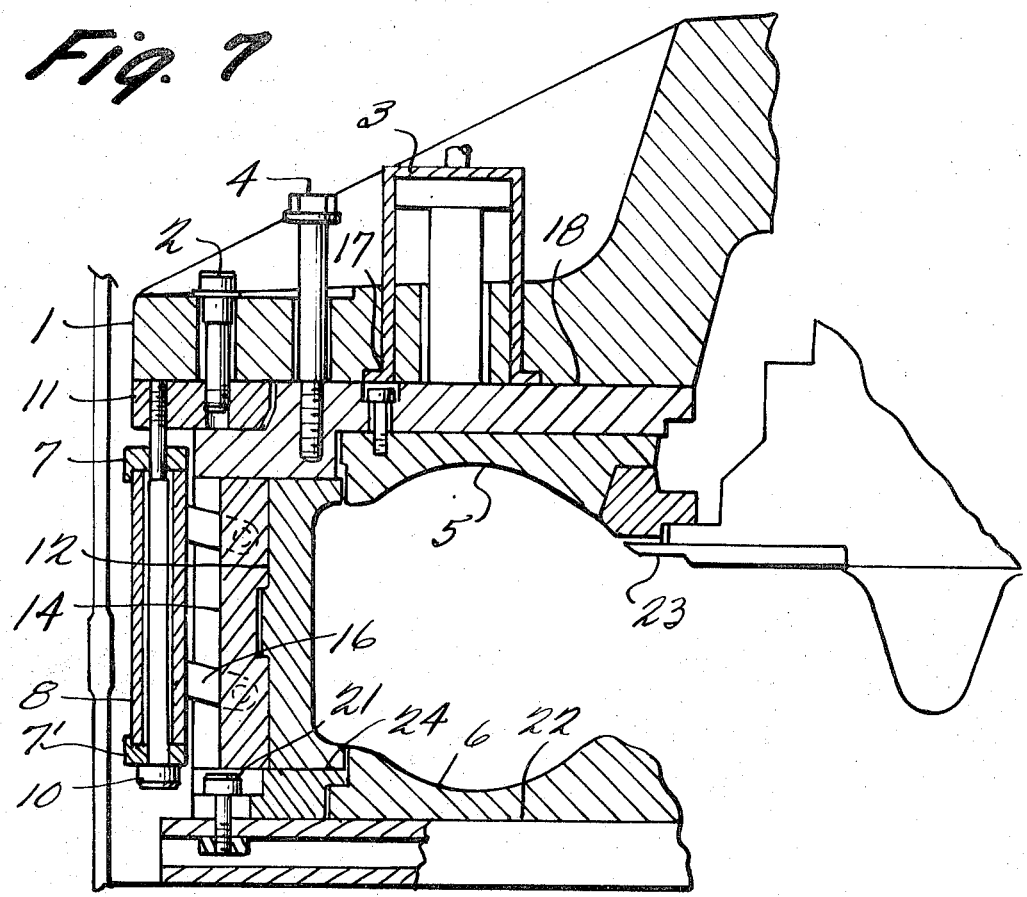
FIG. 7 is a fragmentary vertical sectional side view taken along the line VII—VII of FIG. 3.
Figure 8:
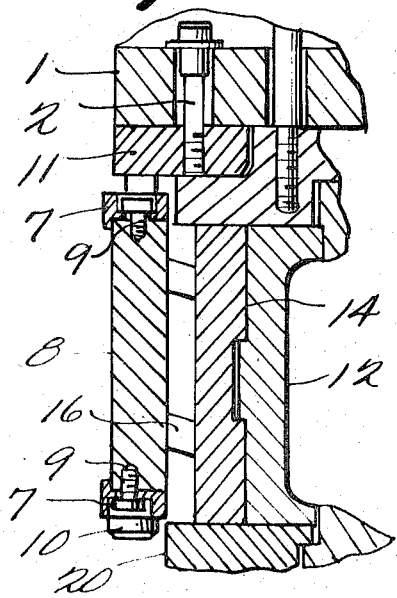
FIG. 8 is a fragmentary vertical sectional side view taken along the line VIII—VIII of FIG. 3.
Figure 9:
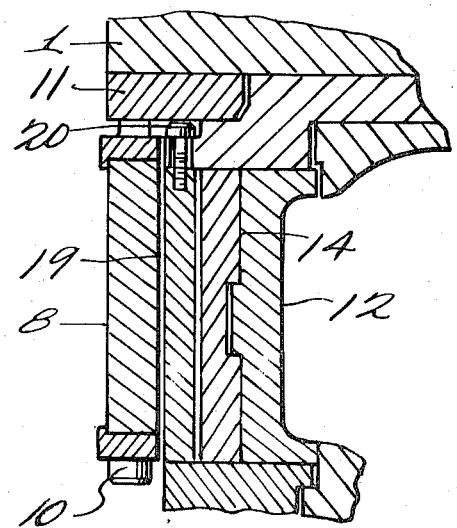
FIG. 9 is a fragmentary vertical sectional side view taken along the line VIII—VIII of FIG. 3.

The present invention will be described in further detail with reference to the embodiment shown in FIGS. 3-9. In these Figures, reference numeral 1 designates a bolster plate (a press plate of a tire vulcanizer), 2 bolts supporting an outer ring wall and tread moulds to be described later on the bolster plate 1, 3 hydraulic cylinder means, and 5 an upper mould connected to an inner top plate 18 integrally therewith by bolts 17. The bolster plate 1 and the upper mould 5 including the inner top plate 18 are integrally held together by means of bolts 4 extending upwardly from the inner plate 18 through the bolster plate 1, in such a manner that they are movable vertically over a predetermined stroke. Reference numeral 6 designates a stationary lower mould and 7-11 designate an outer ring wall assembly.

The outer ring wall assembly comprises upper and lower outer ring plates 7 and 7' respectively, a plurality of outer ring walls 8 respectively disposed between the upper and lower outer ring plates 7 and 7' and fixed thereto by bolts 9, and an adjusting bolt 10 extending through each outer ring wall 8 and the plates 7 upwardly from the underside, with its upper end screwed into the outer top plate 11. The plate 11 itself is fixed to bolster plate 1 by bolts 2. By adjusting adjusting bolts 10, arranged around the lower mould 6, individually relative to each other, it is possible to bring the axis of the outer ring wall assembly, comprising the outer ring plates 7 and 7' and the plurality of walls 8, into alignment with or inclined relative to the axis of the upper and lower moulds. This is useful for the molding position adjustment of the tread moulds 12 to be described later.

The tread moulds 12 are provided in the same number as the number of and are respectively arranged inwardly of the outer ring walls 8 in opposed relation thereto. Radial movement of the tread moulds 12 is caused by the inner top plate 18. The opposed outer ring wall 8 and tread mould 12 (in practice, a segment 14 of wall mould 12 connected integrally with the tread mould 12 by means of bolts 13, as shown in FIG. 3, are interconnected by two pairs of links 16 (one pair on each side of the tread mould). The points 15 of pivotal connection between links 16 and outer ring wall 8 are shiftable vertically by the adjustment of the outer wall ring assembly. The moulding position of each tread mould 12 moves radially outwardly when the points 15 of pivotal connection are shifted upwardly, and moves radially inwardly when the same are shifted downwardly. The inner top plate 18 has stoppers 19 for receiving pressure connected thereto by means of bolts 20 as shown in FIG. 3. The lower mould 6 is fixed to a base 22 of the main body of the vulcanizer by bolts 21 and a set ring 24, as shown, for example, in FIG. 7.

Now, the operation of the mould assembly of the construction described above will be described. Upon completion of vulcanization, the hydraulic cylinder means 3 is actuated and the bolster plate 1 is elevated to the end of its stroke. The upward movement of the bolster plate 1 causes the same amount of upward movement of the outer ring wall assembly or the outer ring walls 3. Therefore, each tread mould 12 is shifted radially outwardly while being pulled by the links 16 and guided by the horizontal guide surface of inner top plate 18, and is thus parted from the tire (see FIG. 6). After the tread moulds 12 are parted from the tire in the manner described, the bolster plate 1 and upper mould 5 are moved upwardly and the side wall of the tire is parted from the lower mould 6 because the tire is secured to a bead portion of the upper mould 5 by chuck means 23 (FIG. 7) just before the mould assembly starts opening. Thereafter, the tire is removed from the vulcanizer.

If there is a gap between the adjoining moulds, burrs will be formed on the moulded tire, which will degrade the uniformity, appearance and quality, of the moulded types and increase the manhours for subsequent processes. In order to eliminate the gaps, in the present invention, the adjusting bolts 10 are turned. The rotation of the adjusting bolts 10 results in a variation of the distance between the outer ring assembly, comprising the parts 7, 8, 7, and the top plate 11. Namely, the axis of the outer ring assembly is aligned with or inclined to the axes of the mould assembly. Such adjustment of the adjusting bolts finely changes the molding positions of the tread moulds 12 to eliminate the gaps between the adjoining moulds, whereby the formation of burrs on the moulded tire can be prevented.

Figure 10:
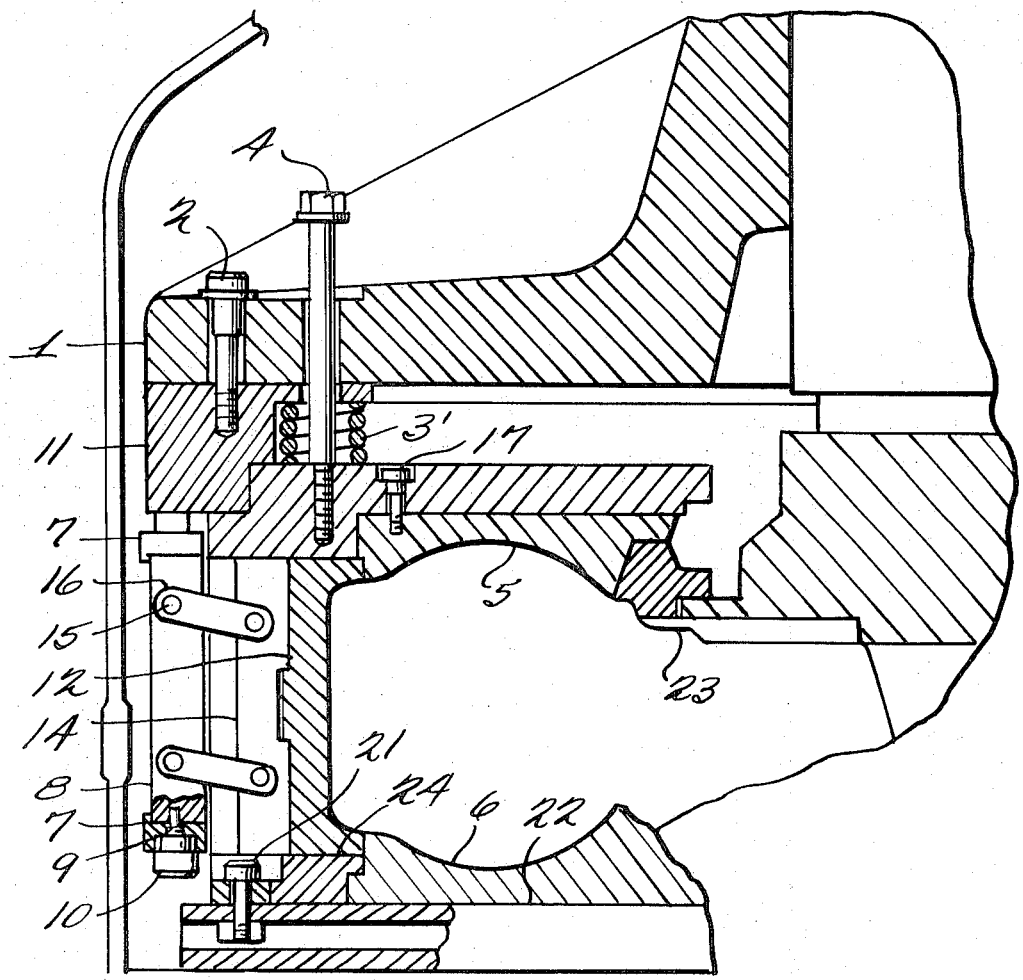
FIG. 10 is a fragmentary vertical sectional side view of another embodiment of the mould assembly of the invention in a closed position.
Figure 11:
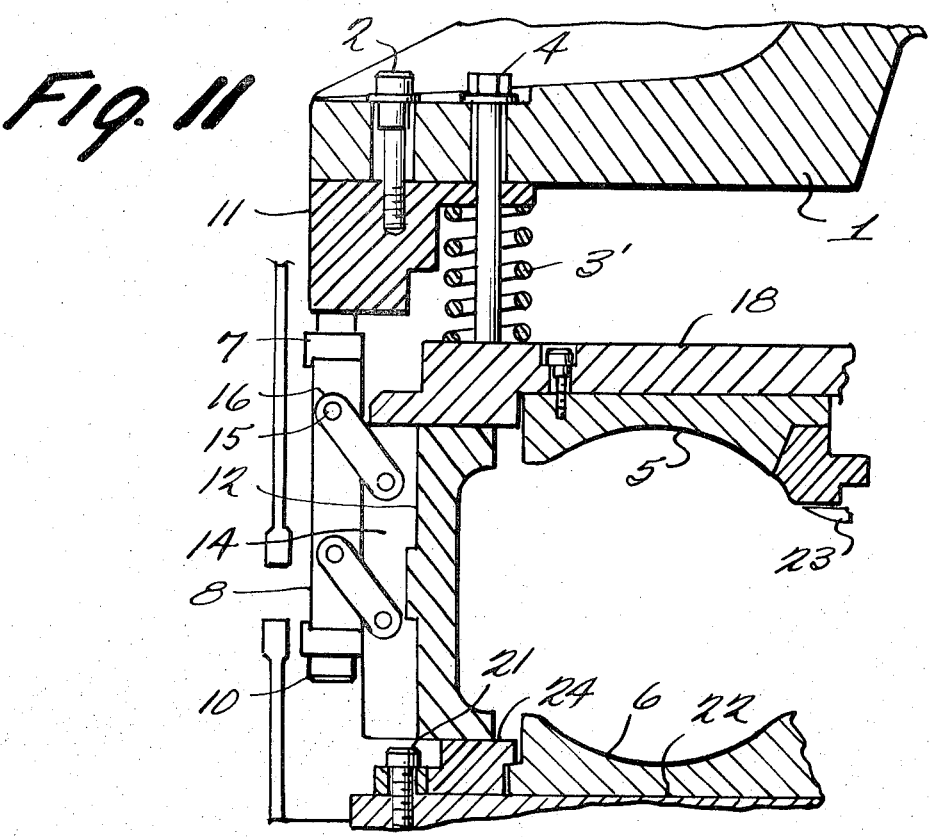
FIG. 11 is a fragmentary vertical sectional side view of the mould assembly of FIG. 10 in an open position.
Figure 12:
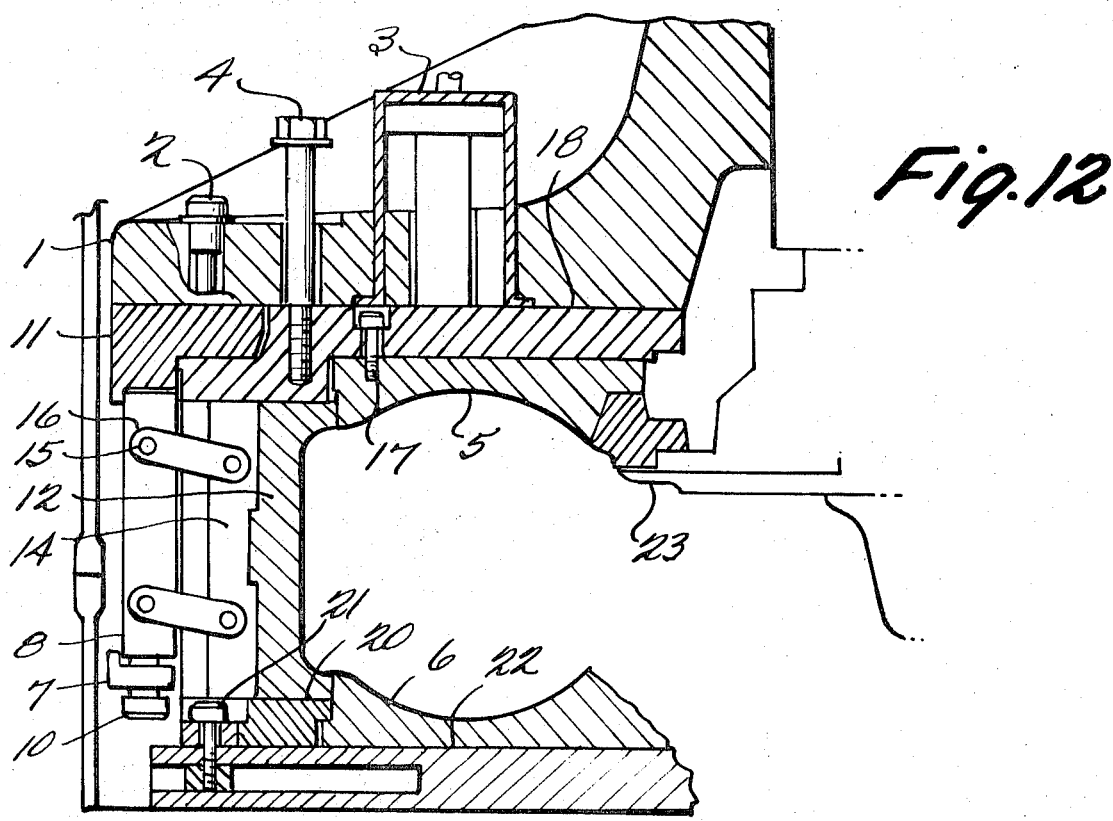
FIG. 12 is a fragmentary vertical sectional side view of still another embodiment of the mould assembly of the invention in a closed position.
Figure 13:
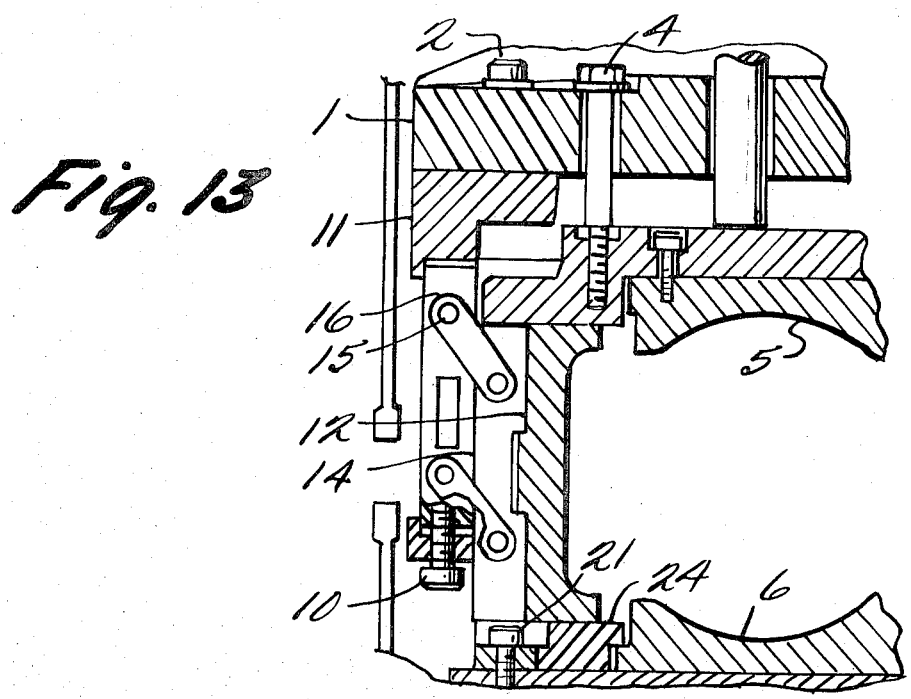
FIG. 13 is a fragmentary vertical sectional view of the mould assembly of FIG. 12 in an open position.
Figure 14:
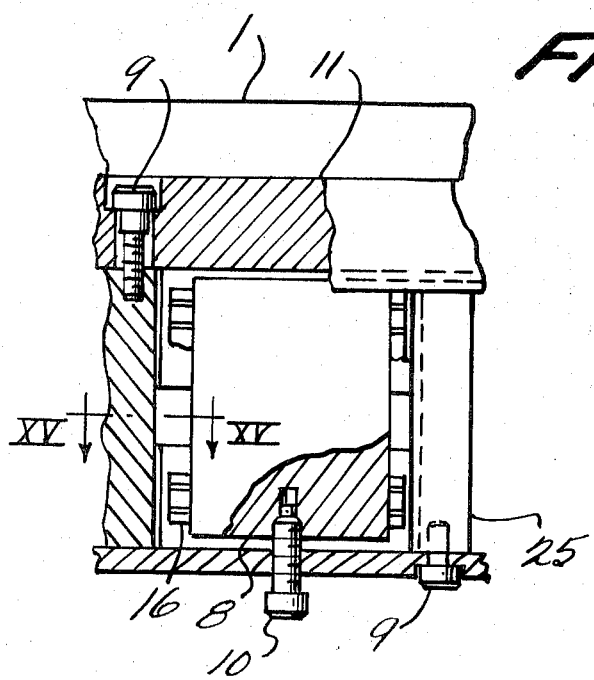
FIG. 14 is a fragmentary sectional side view of FIG. 13.
Figure 15:
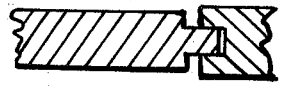
FIG. 15 is a fragmentary transverse sectional plane view taken along the line XV—XV of FIG. 14.
Figure 16:
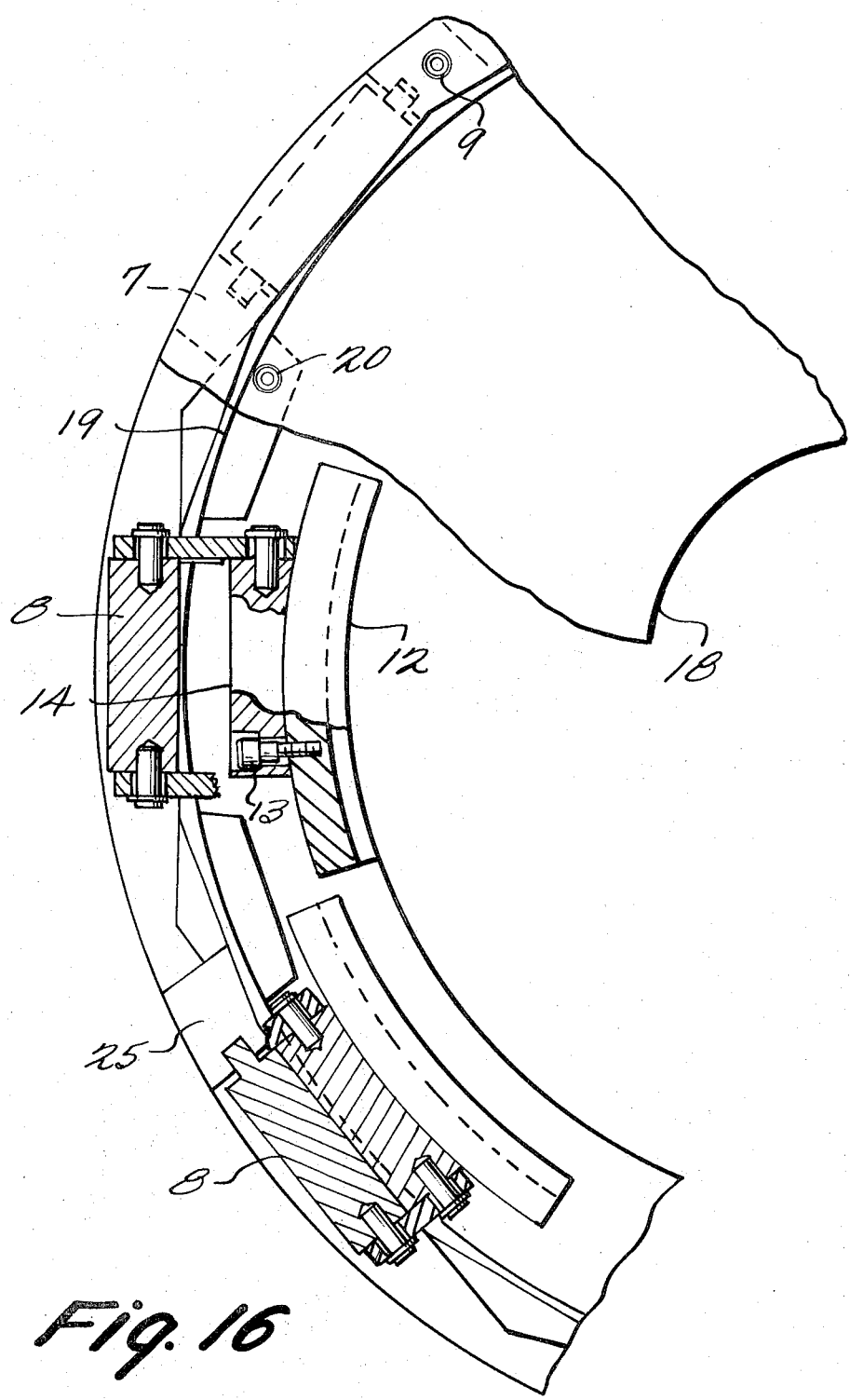
FIG. 16 is a fragmentary plane view of the mould assembly of FIG. 13.

Although the present invention has been described hereinbefore with reference to the embodiment shown in FIGS. 3-9, it is to be understood that the hydraulic cylinder means 3 in the embodiment described may be substituted by springs 3' as shown in FIGS. 10 and 11. Further, the mechanism for adjusting the moulding positions of the tread moulds 12 may be modified as shown in FIGS. 12-16. In this case, the outer ring wall 8 or each tread mould 12 can be adjusted individually. Namely, the upper outer ring plate 7 is connected intimately with the outer top plate 11 and the upper and lower outer ring plates 7 and 7' are interconnected by distance plates 25 (see FIG. 14). The outer ring walls 8 which in this case are shorter than the distance between the outer ring plates 7 and 7' are interposed between outer ring plates 7 and 7' and the distance plates 25 respectively, and each outer ring wall 8 is slidably engaged with the distance plates 25 in the manner shown in FIG. 15. The adjusting bolt 10 is screwed into each outer ring wall 8 from the underside through the lower outer ring plate 7. With such arrangement, it is possible to adjust the outer ring walls 8 individually and, therefore, the moulding position of each tread mould 12 can be changed individually and independently. Such arrangement facilitates simplicity of adjustment because the outer ring wall 8 or tread mould 12 at only the portion where a burr is formed, needs to be adjusted.

Although the present invention has been described and illustrated herein in terms of specific embodiments thereof, it should be understood that the invention is not restricted only to the embodiments but many changes and modifications are possible within the scope not deviating from the spirit of the invention.

What is claimed is:

1. A mould assembly of a tire vulcanizer, of the type having a stationary lower mould, an upper mould moved up and down by a bolster plate, and a plurality of tread moulds arranged around said lower mould and being movable radially of the lower mould, the radial movement of said tread moulds being caused by the vertical movement of said bolster plate, said mould assembly comprising means for vertically moving said bolster plate and said upper mould relative to each other, outer ring walls suspended from said bolster plate and arranged around said tread moulds, links pivotally connecting said outer ring walls with the tread moulds respectively, means for vertically adjusting the points where said links are pivotally connected with said outer ring walls, means provided on said bolster plate for parting said plate from the upper mould in contact with the lower mould and a member provided on the upper mould and having a horizontal guide surface for guiding each tread mould in the radial direction.

2. A mould assembly as in claim 1 wherein said parting means includes pneumatic means.

3. A mould assembly as in claim 1 wherein said parting means includes a spring.

* * * * *